July 28, 1953 M. A. NELSON 2,646,581
CLEANING IMPLEMENT
Filed July 14, 1949 2 Sheets-Sheet 1
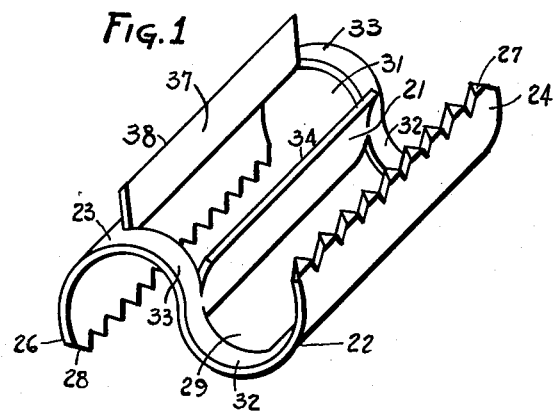
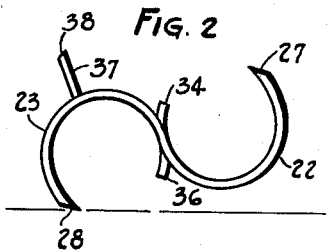 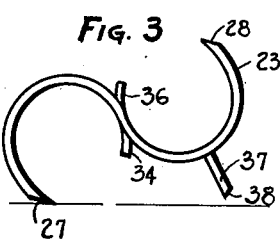 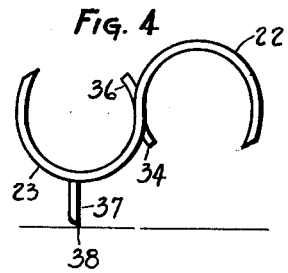
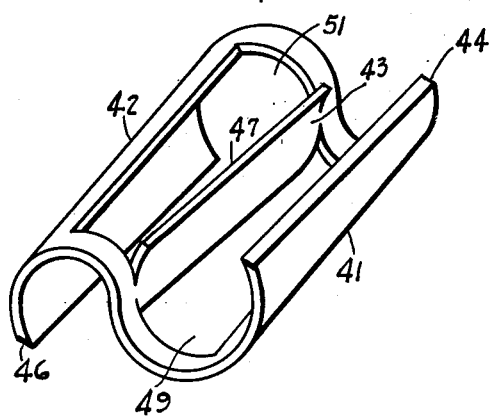
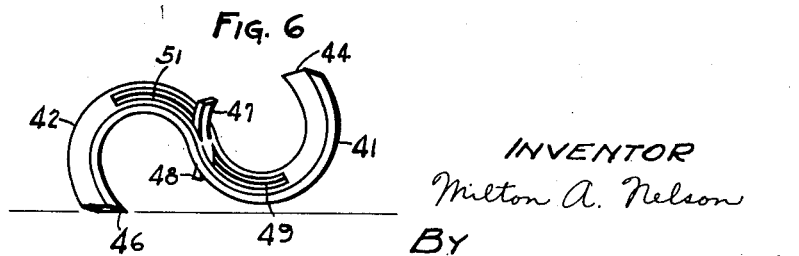
INVENTOR
Milton A. Nelson
BY
McCanna and Morsbach
ATTORNEYS

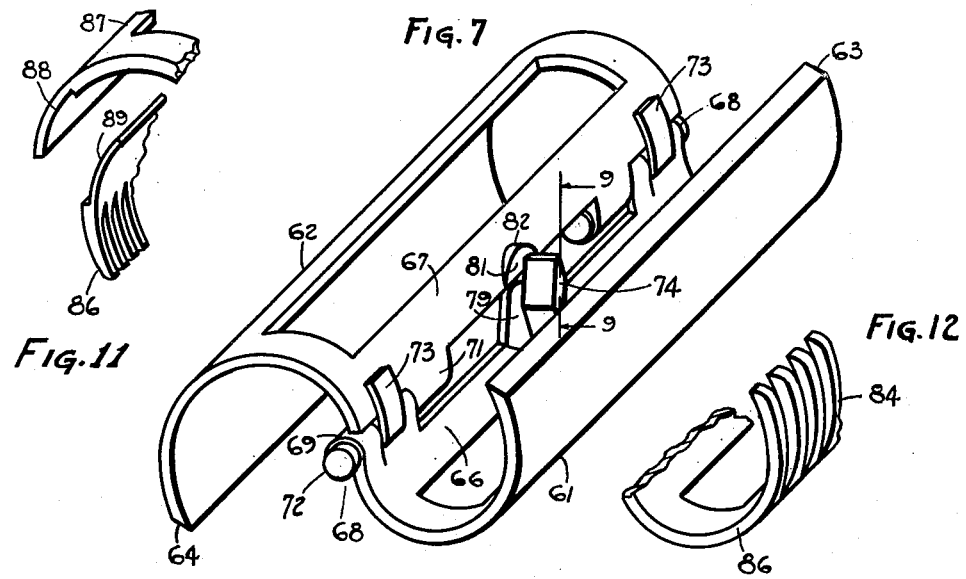
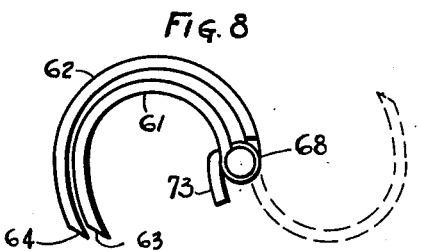
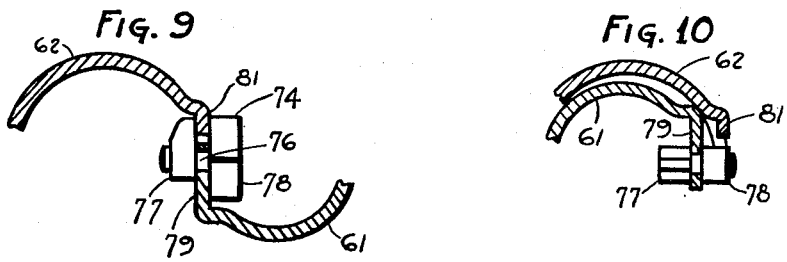
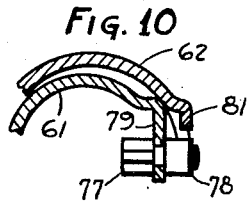

Patented July 28, 1953

2,646,581

UNITED STATES PATENT OFFICE 2,646,581

CLEANING IMPLEMENT

Milton A. Nelson, Rockford, Ill.

Application July 14, 1949, Serial No. 104,717

12 Claims. (Cl. 7—14.1)

1

This invention relates to implements and more particularly to implements of the type used for scraping, cleaning, scaling and the like.

An object of the invention is the provision of a novel implement having a plurality of working edges, that is of simple construction, that is sturdy, and that is relatively inexpensive to produce.

Another object of the invention is the provision of a novel implement that may be used for several different purposes.

Other objects and advantages of the invention will become apparent from the following detailed description taken in connection with the accompanying drawings, in which—

Figure 1 is a perspective view of an implement embodying the present invention wherein the working edges are designed for fish cleaning;

Figs. 2, 3 and 4 are side views of the construction shown in Figure 1 illustrating the positions of the implement for using each of the working edges thereof;

Fig. 5 is a perspective view of an implement showing a modification of the invention;

Fig. 6 is a side view of the construction shown in Fig. 5;

Fig. 7 is a perspective view of an implement showing another modification of the invention;

Fig. 8 is a side view of the implement shown in Fig. 7 showing the parts of the implement in their operative and retracted positions;

Figs. 9 and 10 are sectional views taken substantially along the line 9—9 of Fig. 7 with the portions of the implement in their operative and retracted positions, respectively;

Fig. 11 is a perspective view of an end portion of an implement showing the details of construction for detachably securing a working edge to the implement; and Fig. 12 is a perspective view of a working edge having elongated teeth.

The invention is shown embodied in manually manipulable implements having a plurality of working edges. For purposes of illustration several embodiments of the invention are shown. The implement shown in Figs. 1–4 may be used for scaling or cleaning fish. As shown the implement comprises a central portion 21 and curved or arcuate portions 22 and 23 extending in opposite directions from the central portion to define a body having a cross sectional configuration resembling the letter S. The curved portions 22 and 23 terminate in end portions 24 and 26 having working edges 27 and 28, respectively, formed thereon spaced from the central portion 21 and

2 in substantial parallelism therewith. As shown the working edges 27 and 28 are formed by spaced teeth having a triangular shaped cross section. Preferably the end portions 24 and 26 are sufficiently long so that the working edges 27 and 28 extend beyond the center line drawn between the centers of the curved portions. Sections of the curved portions 22 and 23, respectively, adjacent the central portion 21 are removed to define finger openings 29 and 31 in the curved portions intermediate the central portion 21 and the end portions 24 and 26, and spaced side members 32 for connecting the end portion 24 with the central portion 21 and spaced side members 33 for connecting the end portion 26 with the central portion 21. A tab 34 on the central portion 21 adjacent the opening 31 is curved toward the working edge 27 as best seen in Fig. 2. In a similar manner a tab 36 on the opposite edge of the central portion 21 adjacent the opening 29 is curved toward the working edge 28. A tab 37 on the side of the opening 31 spaced from the tab 34 is rigid with the end portion 26 and projects outwardly from the curved portion 23 as best seen in Fig. 2. The tab 37 terminates in a working edge 38, herein in the form of a scraping edge, facing in the same direction as the working edge 27 and in substantial parallelism therewith.

To use the working edge 28 the operator places the curved portion 22 in the palm of his hand so that his fingers span the gap between the working edge 27 and tab 34 and extend through the opening 31 to rest on the central portion 21 and the tabs 34 and 36. The tab 34 presents a convex surface and provides a rest for his fingers. The tab 36 presents a concave surface to the ends of the operator's fingers and provides a stop or positioning means therefor. The operator's thumb may extend along the edge of the implement adjacent the sides 32 and 33. With the operator's hand in this position, the curved portion 22, the tabs 34 and 36 and the central portion 21 in effect define a handle which may be conveniently and easily gripped for holding the implement when it is desired to use the working edge 28. With the implement being held in the above position the edge 28 may be pulled relative to any desired work surface so that the desired scraping or scaling action is obtained.

When it is desired to use the edge 27 (see Fig. 3) the implement is held so that the curved portion 23 fits in the operator's hand and the operator's fingers span the space between the working edge 28 and the tab 36 and extend through the opening 29 to rest on the central portion 21 and tabs 34 and 36. In this instance the tab 36 presents a convex surface which forms a rest for the operator's fingers and the tab 34 presents a concave surface for positioning the operator's fingers. Thus the curved portion 23, the tabs 34 and 36, and the central portion 21 in effect define a handle when it is desired to use the edge 27. When the implement is held in this position the edge 27 may be moved relative to any work surface to obtain a desired scaling or scraping action.

To use the knife edge 38 (see Fig. 4) the implement is positioned so that the curved portion 22 is disposed in the palm of the operator's hand and his fingers span the opening 29 and extend around the tab 36 and rest on the central portion 21 and the convex surface of the tab 34.

From the aforegoing it is seen that in using any working edge an adjacent portion of the implement provides a convenient handle for holding the implement in an operative position. Too, the arrangement and construction of the implement is such that all of the working edges may be readily used. This construction is such also that by manipulation of the hands the cutting edge may be disposed at any desired angle with respect to the work surface.

In Figs. 5 and 6 a modification of the invention is shown embodied in a scraping implement. In general the implement comprises curved or arcuate portions 41 and 42 extending outwardly from opposite sides of a central portion 43. In this embodiment of the invention the curved portion 41 is of varying cross section from one side of the implement to the other so that in effect it tapers from one side of the implement to the other side. The curved portion 42 is of similar construction and tapers from side to side in a direction opposite to that of the curved portion 41. As a consequence the central portion 43 is disposed at an angle to the working edges 44 and 46, respectively, which are in parallelism and are formed at the extreme ends of the curved portions 41 and 42. The central portion is formed with a tab 47 curved toward the working edge 44 and a tab 48 curved toward the working edge 46 in a manner described for the first embodiment. Sections of the curved portions are removed to define openings 49 and 51, respectively, in the curved portions adjacent the central portion 43. The implement may be held in the manner described for the first embodiment of the invention. With this construction it will be observed that when the central portion 43 is moved relative to a work surface the working edges 44 or 46 are inclined at an angle to the direction of movement of the implement and consequently a shearing action results as the edges 44 or 46 move relative to a work surface.

In Figs 7, 8, 9 and 10 another modification of the invention is shown embodied in a scraping implement. In general it comprises a pair of curved or arcuate portions 61 and 62, one being of smaller dimensions than the other so that it may be positioned in a nested relation with the larger as shown in Fig. 8. Sections are removed from each of the curved portions to define openings in the same manner and for the same purpose as described for the embodiment of the invention shown in Figure 1. One edge of the curved portion 61 terminates in a working edge 63 and one edge of the curved portion 62 terminates in a working edge 64 facing in an opposite direction from the working edge 63. The opposite edge 66 of the curved portion 61 is connected to the opposite edge 67 of the curved portion 62 by a hinge connection 68 at opposite sides of the implement. The hinge connections 68 may be formed by curling portions 69 of the edge 66 to define eyelets and curling an edge 71 of the edge portion 67 to define an eyelet shaped to be in axial alinement with the eyelet defined by the curled portion 69 when the arcuate portions are in the position shown in Fig. 7 to receive a hinge pin 72. With this construction the portion 61 may be moved from the solid line position shown in Fig. 8 in which it is nested in the portion 62 to the dotted line position so that the curved portions 61 and 62 in effect define a body having a generally S-shaped configuration. To properly position the curved portions 61 and 62 in their operative position; that is, the dotted line position shown in Fig. 8, an intermediate portion 73 of each curled portion 69 is deformed to extend outwardly from the edge 66 to provide a stop that engages the periphery of the edge portion 67 adjacent the hinge connections 68. A lock means is provided intermediate the sides of the implement to hold the curved portions in their operative position. As best seen in Figs. 7, 9 and 10 the lock means includes a generally H-shaped keeper 74 having a shaft 76 interconnecting spaced legs 77 and 78. As shown the shaft 76 is formed by a riveted shank or shaft which secures the leg portions 77 and 78 in spaced relation. The shaft 76 extends through an opening formed in a rib 79 intermediate the sides of the scraper and forming a part of the edge 66. The keeper may be rotated between the positions shown in Fig. 9 and Fig. 10. In the position shown in Fig. 9 the legs 77 and 78 respectively engage the rib 79 and opposite sides of a wall 81. The wall 81 is formed on a projecting portion 82 of the edge 67, to be in alinement with the rib 79. When the keeper is rotated to the position shown in Fig. 10 the legs 77 and 78 are in a position to overlie the edges of the rib 79 which are spaced from the hinged portions 68. With the keeper in this position the curved portion 61 can be folded under the curved portion 62 as shown in Fig. 8. This implement is held in the same manner as the embodiment shown in Figure 1. One advantage of this construction over the other embodiments shown is that the storage space required for this implement is much smaller.

Any suitable working edge may be employed for any of the embodiments of the invention shown herein. For example the working edges 27 and 28 (see Figure 1) may be formed with scraper edges as where it is desired to use the implement of Figure 1 for removing old paint from surfaces, meat scraps from butcher's blocks and removing flesh from hides during a tanning treatment. Also where desired the working edge 38 may be of a toothed construction. It is to be understood that the teeth may have different shapes, lengths and cross sectional shapes depending on the desired use of the implement. For example it is possible to have elongated teeth 84 such as shown in Fig. 12 formed on a working edge 86 when it is desired to utilize the implement as a small hand cultivator for home gardens, or when it is desired to make a comb for combing hair or for grooming animals. Other shapes of teeth may be more desirable for other purposes. The working edge may be integrally formed with the implement or it may be detachably removed such as is shown in Fig. 11. In Fig. 11 the working edge 86 is detachably removed from a curved portion 87. To insure a tight fit between the parts a recessed portion 88 is formed on the curved portion 87 and a mating recessed portion 89 is formed on the working edge 86. The recessed portions 88 and 89 interfit and the parts may be secured together by means of screws (not shown) or by welded, soldered or brazed construction. Too, the working edges may be formed as knife edges so that the implement may be used for cutting and slitting purposes. Any of the forms of the invention shown herein may be made as simple sheet metal stampings. Thus a flat sheet of metal may be deformed by simple pressing operations to define the body of the implement and the tabs and the sections that are removed from the curved portions may be readily blanked out. Consequently such an implement may be made very inexpensively. Where desired the implements may be fabricated by other means. Any other suitable material may also be used in the fabrication of one of these implements. Too, the implements may be die-cast or molded. Also they can be made from plastic or hard rubber and the like materials by conventional molding processes in general use.

While the general cross sectional shape of the implement is S-shaped as shown herein, it is to be understood that it may assume other forms as will be readily apparent to those skilled in the art. Also where desired one of the curved or arcuate portions may be folded over completely to engage one of the tabs adjacent the central portion to define an implement having a single working edge with a tubular handle portion.

I claim:

1. An implement having a body comprising a central portion and end portions curved outwardly from opposite sides of the central portion in opposite directions, said end portions each having an opening adjacent the central portion and each terminating in an elongated blade spaced from the central portion and extending transversely of the outward extent of the receptive end portions, said central portion together with one of the blade end portions defining a handle to fit the contour of a user's hand for holding the implement in a position to use the other blade as the working face.

2. An implement comprising a sheet material body having a central portion and curved portions extending outwardly from said central portion in opposite directions to define a generally S-shaped body, said curved portions each having a section removed adjacent the central portion to form respective openings thereat and each terminating in an elongated blade section extending transversely of the outward extent of the curved portions in spaced relation to the central portion, said central portion and either of the curved portions defining a handle with the blade section extending across the palm of the operator's hand and said central portion forming a surface engaged by the operator's fingers extending through the removed section of the other curved portion for manually holding the body to use the other blade as the working face.

3. An implement comprising a sheet material body comprising a central portion and portions curved outwardly from the central portion in opposite directions to define a generally S-shaped body, said latter portions each having an opening adjacent the central portion and each terminating in a blade which is formed with a working edge, said central portion having tabs formed on opposite sides, said tabs respectively curving in the direction of the adjacent working edge, said central portion together with one of the blades defining a handle to fit the contour of a user's hand for holding the implement in a position to use the working edge of the other blade, one of said tabs on the central portion presenting a convex surface to the user's hand to provide a rest for his fingers and the other tab presenting a concave surface to the user's hand to provide a positioning means for the ends of the user's fingers when said one of the blades extends transversely across the user's hand.

4. An article of manufacture comprising a body having spaced end portions, a central portion intermediate the end portions, and spaced side portions interconnecting said central portion and said end portions and defining therewith transversely elongated openings between said central portion and the respective end portions for receiving the user's fingers, one of said end portions being bent over to terminate in a downwardly extending blade at one side of the central portion, the other of said end portions being bent over to terminate in an upwardly extending blade at the opposite side of the central portion, said central portion and the upwardly extending blade of the respective end portion defining a handle for holding the body to use the other blade as the working face.

5. An implement comprising a body having a central portion and end portions curved outwardly from opposite sides of the central portion in opposite directions, said end portions tapering in opposite directions from one side of the body to the opposite side of the body, said end portions each having an opening adjacent the central portion, one of said end portions terminating in an elongated blade spaced from the central portion and extending transversely of the outward extent of the respective end portions disposed at an angle to the central portion, the other of said portions terminating in an elongated blade spaced from the central portion and extending transversely of the outward extent of the respective end portions at an angle thereto and facing in a different direction than the blade on the first end portion, said central portion and one of the blade end portions defining a handle to fit the contour of a user's hand for holding the implement in a position to use the other blade as the working face to effect a shearing movement as the implement is moved relative to a workpiece.

6. An implement comprising a body having a central portion and end portions extending outwardly from the central portion in opposite directions, said end portions each having an opening adjacent the central portion and each terminating in a blade spaced from the central portion, at least one of said end portions having a tab at an angle to the periphery thereof terminating in a working edge, said central portion and one of the outwardly extending portions defining a handle for manually holding the body in an operative position to use at least one of the other blades as the working surface.

7. An implement comprising a body having a central portion and end portions extending outwardly from opposite sides of the central portion in opposite directions, said end portions each having an opening adjacent the central portion and each terminating in an elongated blade spaced from the central portion and extending transversely of the outward extent of the respective end portions, each of said blades being detachably secured to the respective end portion in spaced relation from said central portion, said central portion and either of the end portions together with its detachable blade defining a handle to fit the contour of a user's hand for manually holding the body in a position to use the other of the blades as the working surface.

8. An implement comprising a first arcuate portion having a section removed and one end portion terminating in an elongated blade, a second arcuate portion having a recess formed intermediate its ends and one end portion terminating in an elongated blade, one of said arcuate portions being of smaller dimensions than the other and shaped to be nested in the other, hinge means interconnecting the adjacent segments respectively of each of said arcuate portions permitting movement of said one arcuate portion between its nested position and a working position in which the implement has a generally S-shaped configuration, said hinge connections and the adjacent segments of the arcuate portions in said working position of the implement forming a central portion between said blades, said arcuate portions in said working position of the implement being curved outwardly from opposite sides of said central portion in opposite directions and said blades being spaced from said central portion in said working position of the implement and extending transversely of the outward extent of the respective arcuate portions, one of said arcuate portions and said central portion defining a handle to fit the contour of a user's hand for holding the implement in a position to use the blade on the other arcuate portion as the working surface of the implement.

9. The combination recited in claim 8 with stop means acting between the arcuate portions to positively position the arcuate portions in their working position.

10. The combination recited in claim 8 with keeper means acting between the arcuate portions to positively hold the arcuate portions in their working position.

11. An implement comprising a body having a central portion and spaced bent over end portions connected to said central portion and extending on opposite sides thereof, said end portions being separated from said central portion by open sections extending transversely thereacross and defining openings to receive the operator's fingers, each said end portion being elongated transversely in spaced relation from the adjacent open section so that one of said end portions extends across the palm of the operator's hand while said central portion provides a surface engaged by the operator's fingers extending through the opening at the open section adjacent the other end portion for manually holding the implement to use said other end portion as the working face of the implement.

12. An implement comprising a body having a central portion and arcuate end portions extending outwardly from the central portion on opposite sides thereof, said end portions being formed with cutaway sections extending transversely thereacross adjacent the central portion and defining openings located respectively between the central portion and the respective end portions, each of said arcuate end portions being formed with a surface which is elongated transversely of the outward extent of said end portion in spaced relation from the transverse cutaway sections thereof, said transversely elongated surface on one of said end portions extending across the palm of the operator's hand and said transverse cutaway section on said other end portion forming a finger receiving section for manual gripping of said implement between said one end portion and the central portion to use the other arcuate end portion as the working surface of the implement.

MILTON A. NELSON.

References Cited in the file of this patent

UNITED STATES PATENTS

| Number | Name | Date |
|---|---|---|
| 281,200 | Murphy | July 10, 1883 |
| 561,957 | Ball | June 16, 1896 |
| 614,810 | Houghton | Nov. 22, 1898 |
| 663,303 | Sutton | Dec. 4, 1900 |
| 2,033,801 | Zehender | Mar. 10, 1936 |
| 2,347,473 | Ericksen | Apr. 25, 1944 |

FOREIGN PATENTS

| Number | Country | Date |
|---|---|---|
| 341,216 | Great Britain | Jan. 15, 1931 |